(12) United States Patent
Smith et al.

(10) Patent No.: US 6,302,992 B1
(45) Date of Patent: Oct. 16, 2001

(54) RETROREFLECTIVE CUBE CORNER SHEETING, MOLDS THEREFORE, AND METHODS OF MAKING THE SAME

(75) Inventors: Kenneth L. Smith, White Bear Lake; Gerald M. Benson, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/656,697

(22) Filed: Sep. 7, 2000

Related U.S. Application Data

(63) Continuation of application No. 08/887,390, filed on Jul. 2, 1997, now abandoned.

(51) Int. Cl.$^7$ .............................. B32B 31/00; B29D 11/00
(52) U.S. Cl. ......................... 156/268; 156/153; 156/250; 264/1.7; 264/2.5; 264/219; 249/187.1; 249/205
(58) Field of Search ............................... 264/1.7, 1.6, 2.5, 264/167, 219, 220; 359/529, 530; 249/187.1, 205; 156/153, 250, 257, 268

(56) References Cited

U.S. PATENT DOCUMENTS

| Re. 29,396 | 9/1977 | Heenan . |
|---|---|---|
| 835,648 | 11/1906 | Straubel . |
| 1,591,572 | 7/1926 | Stimson . |

(List continued on next page.)

FOREIGN PATENT DOCUMENTS

| 19 17 292 | 10/1970 | (DE) . |
|---|---|---|
| 92 17 179.6 | 6/1993 | (DE) . |
| 42 36 799 C2 | 5/1994 | (DE) . |
| 42 40 680 A1 | 6/1994 | (DE) . |
| 42 36 799 A1 | 9/1994 | (DE) . |
| 44 10 994 C2 | 1/1996 | (DE) . |
| 44 29 683 C1 | 3/1996 | (DE) . |
| 297 01 903 U1 | 5/1997 | (DE) . |
| 1289029 | 2/1962 | (FR) . |
| 8-309851 | 11/1996 | (JP) . |

(List continued on next page.)

OTHER PUBLICATIONS

American Society for Testing and Materials, ASTM Designation E808–94, "Standard Practice for Describing Retroreflection" *1994 Annual Book of ASTM Standards*, vol. 6.01, Apr. 1994.

Cooke, "Optical Activities In Industry," *Applied Optics*, vol. 20, No. 8, Apr. 15, 1981.

Eckhardt, H.D., "Simple Model of Corner Reflector Phenomena," *Applied Optics*, Jul., 1971, vol. 10, No. 7.

*Primary Examiner*—Donald J. Loney
(74) *Attorney, Agent, or Firm*—Stephen C. Jensen

(57) ABSTRACT

A method is disclosed for manufacturing a plurality of laminae for use in a mold suitable for use in forming retroreflective cube corner articles. Each lamina has opposing first and second major surfaces defining therebetween a first reference plane. Each lamina further includes a working surface connecting the first and second major surfaces. The working surface defines a second reference plane substantially parallel to the working surface and perpendicular to the first reference plane and a third reference plane perpendicular to the first reference plane. The method includes (a) orienting a plurality of laminae to have their respective first reference planes parallel to each other and disposed at a first angle relative to a fixed reference axis, (b) forming a plurality of cube corner elements on the working surfaces of the plurality of the laminae, wherein the plurality of cube corner elements have three approximately mutually perpendicular lateral faces that mutually intersect to define a cube corner element peak, and (c) removing a plurality of laminae from the assembly to alter the configuration of the mold surface.

31 Claims, 9 Drawing Sheets

U.S. PATENT DOCUMENTS

| | | |
|---|---|---|
| 3,190,178 | 6/1965 | McKenzie . |
| 3,417,959 | 12/1968 | Schultz . |
| 3,443,281 | 5/1969 | Walby . |
| 3,541,606 | 11/1970 | Heenan et al. . |
| 3,632,695 | 1/1972 | Howell . |
| 3,684,348 | 8/1972 | Rowland . |
| 3,712,706 | 1/1973 | Stamm . |
| 3,873,184 | 3/1975 | Heenan . |
| 3,922,065 | 11/1975 | Schultz . |
| 3,923,378 | 12/1975 | Heenan . |
| 3,924,928 | 12/1975 | Trimble . |
| 3,926,402 | 12/1975 | Heenan . |
| 4,025,159 | 5/1977 | McGrath . |
| 4,066,236 | 1/1978 | Lindner . |
| 4,066,331 | 1/1978 | Lindner . |
| 4,095,773 | 6/1978 | Lindner . |
| 4,588,258 | 5/1986 | Hoopman . |
| 4,601,861 | 7/1986 | Pricone et al. . |
| 4,775,219 | 10/1988 | Appledorn et al. . |
| 5,066,098 | 11/1991 | Kult et al. . |
| 5,156,863 | 10/1992 | Pricone et al. . |
| 5,300,263 | 4/1994 | Hoopman et al. . |
| 5,450,235 | 9/1995 | Smith et al. . |
| 5,557,836 | 9/1996 | Smith et al. . |
| 5,564,870 | 10/1996 | Benson et al. . |
| 5,565,151 | 10/1996 | Nilsen . |
| 5,585,164 | 12/1996 | Smith et al. . |
| 5,600,484 | 2/1997 | Benson et al. . |
| 5,898,523 | 4/1999 | Smith et al. . |
| 5,936,770 | 8/1999 | Nestegard et al. . |
| 5,981,032 | 11/1999 | Smith et al. . |
| 6,015,214 | 1/2000 | Heenan et al. . |
| 6,114,009 | 9/2000 | Smith . |

FOREIGN PATENT DOCUMENTS

| | | |
|---|---|---|
| WO 94/18581 | 8/1994 | (WO) . |
| WO 95/11464 | 10/1994 | (WO) . |
| WO 96/42024 | 12/1996 | (WO) . |
| WO 97/04939 | 2/1997 | (WO) . |
| WO 97/04940 | 2/1997 | (WO) . |
| WO 97/27035 | 7/1997 | (WO) . |
| WO 97/45255 | 12/1997 | (WO) . |

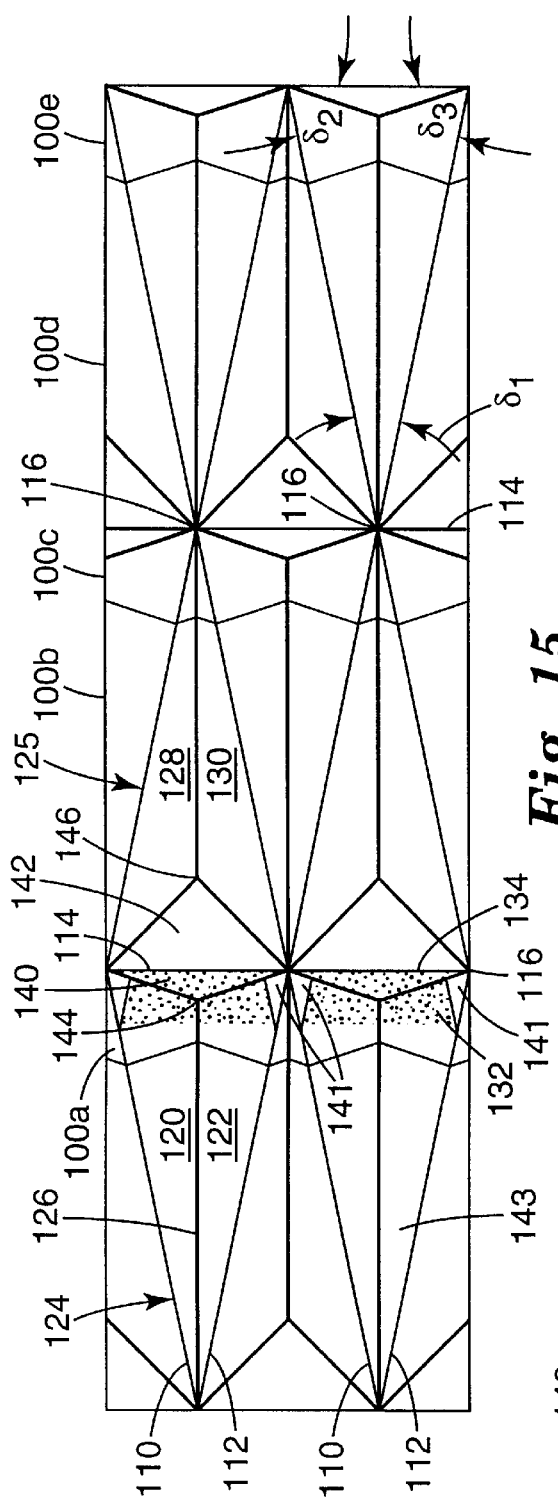
*Fig. 15*
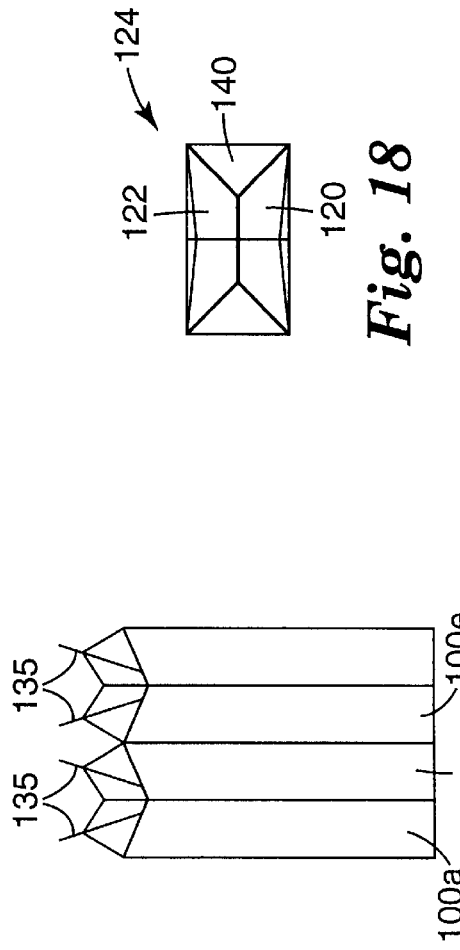
*Fig. 18*
*Fig. 17*
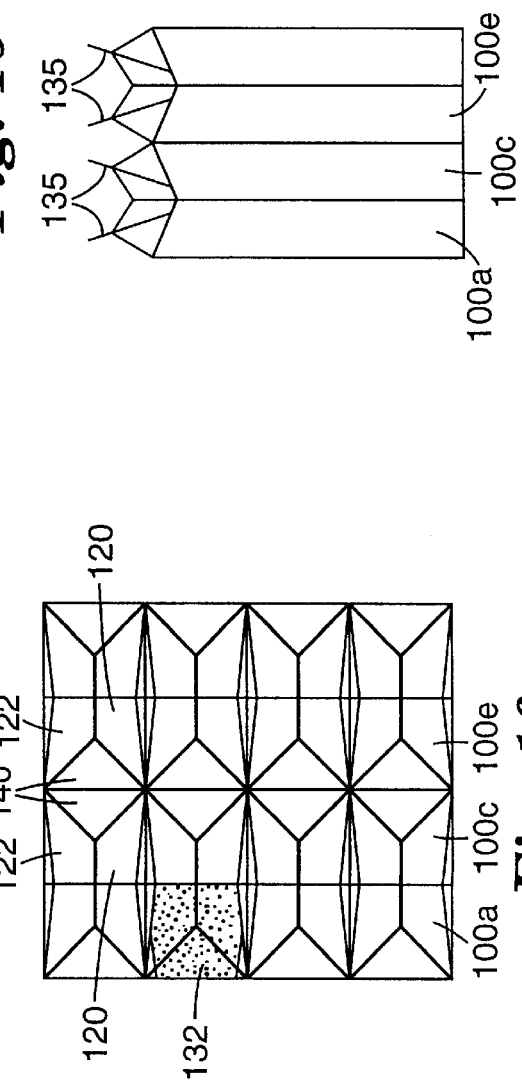
*Fig. 16*

RETROREFLECTIVE CUBE CORNER SHEETING, MOLDS THEREFORE, AND METHODS OF MAKING THE SAME

CROSS-REFERENCE TO RELATED APPLICATIONS

This is a continuation of U.S. patent application Ser. No. 08/887,390, filed Jul. 2, 1997 now abandoned.

FIELD OF THE INVENTION

The present invention relates generally to molds suitable for use in forming cube corner retroreflective sheeting formed from a plurality of laminae, to methods for making such molds, and to retroreflective sheeting formed from such molds which utilize sacrificial laminae to change the configuration of the structured surface in a desired manner.

BACKGROUND OF THE INVENTION

Retroreflective materials are characterized by redirecting incident light back toward the originating light source. This property has led to the wide-spread use of retroreflective sheeting in a variety of conspicuity applications. Retroreflective sheeting is frequently applied to flat, rigid articles such as, for example, road signs and barricades; however, it is also used on irregular or flexible surfaces. For example, retroreflective sheeting can be adhered to the side of a truck trailer, which requires the sheeting to cover corrugations and protruding rivets, or the sheeting can be adhered to a flexible body portion such as a road worker's safety vest or other such safety garment. In situations where the underlying surface is irregular or flexible, the retroreflective sheeting desirably possesses the ability to conform to the underlying surface without sacrificing retroreflective performance. Additionally, retroreflective sheeting is frequently packaged and shipped in roll form, thus requiring the sheeting to be sufficiently flexible to be rolled around a core.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Illustrative examples are disclosed in U.S. Pat. Nos. 3,190,178 (McKenzie), U.S. Pat. No. 4,025,159 (McGrath), and U.S. Pat. No. 5,066,098 (Kult). Advantageously, microsphere-based sheeting can generally be adhered to corrugated or flexible surfaces. Also, due to the symmetry of beaded retroreflectors, microsphere-based sheeting exhibits a relatively orientationally uniform total light return when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting comprises a body portion typically having a substantially planar base surface and a structured surface comprising a plurality of cube corner elements opposite the base surface. Each cube-corner element comprises three mutually substantially perpendicular optical faces that intersect at a single reference point, or apex. The base of the cube corner element acts as an aperture through which light is transmitted into the cube corner element. In use, light incident on the base surface of the sheeting is refracted at the base surface of the sheeting, transmitted through the bases of the cube corner elements disposed on the sheeting, reflected from each of the three perpendicular cubecorner optical faces, and redirected toward the light source. The symmetry axis, also called the optical axis, of a cube corner element is the axis that extends through the cube corner apex and forms an equal angle with the three optical surfaces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

The maximum retroreflective efficiency of cube corner retroreflective sheeting is a function of the geometry of the cube corner elements on the structured surface of the sheeting. The terms 'optically active area' and 'effective aperture' are used in the cube corner arts to characterize the portion of a cube corner element that retroreflects light incident on the base of the element. A detailed teaching regarding the determination of the active aperture for a cube corner element design is beyond the scope of the present disclosure- One procedure for determining the effective aperture of a cube corner geometry is presented in Eckhardt, Applied Optics, v. 10, n. 7, July, 1971, pp. 1559–1566. U.S. Pat. No. 835,648 to Straubel also discusses the concept of effective aperture. At a given incidence angle, the optically active area can be determined by the topological intersection of the projection of the three cube corner faces onto a plane normal to the refracted incident light with the projection of the image surfaces for the third reflections onto the same plane. The term 'percent active area' is then defined as the active area divided by the total area of the projection of the cube corner faces. The retroreflective efficiency of retroreflective sheeting correlates directly to this percent active area.

Additionally, the optical characteristics of the retroreflection pattern of retroreflective sheeting are, in part, a function of the physical geometry of the cube corner elements. Thus, distortions in the geometry of the cube corner elements can cause corresponding distortions in the optical characteristics of the sheeting. To inhibit undesirable physical deformation, cube corner elements of retroreflective sheeting are typically made from a material having a relatively high elastic modulus sufficient to inhibit the physical distortion of the cube corner elements during flexing or elastomeric stretching of the sheeting. As discussed above, it is frequently desirable that retroreflective sheeting be sufficiently flexible to allow the sheeting to adhere to a substrate that is corrugated or that is itself flexible, or to allow the retroreflective sheeting to be wound into a roll to facilitate storage and shipping.

Cube corner retroreflective sheeting has traditionally been manufactured by first manufacturing a master mold that includes an image, either negative or positive, of a desired cube corner element geometry. The mold can be replicated using nickel electroplating, chemical vapor deposition or physical vapor deposition to produce tooling for forming cube corner retroreflective sheeting. U.S. Pat. No. 5,156,863 to Pricone, et al. provides an illustrative overview of a process for forming tooling used in the manufacture of cube corner retroreflective sheeting. Known methods for manufacturing the master mold include pin-bundling techniques, direct machining techniques, and laminate techniques. Each of these techniques has benefits and limitations.

In pin bundling techniques, a plurality of pins, each having a geometric shape on one end, are assembled together to form a cube-corner retroreflective surface. U.S.

Pat. No. 1,591,572 (Stimson), U.S. Pat. No. 3,926,402 (Heenan), U.S. Pat. No. 3,541,606 (Heenan et al.) and U.S. Pat. No. 3,632,695 (Howell) provide illustrative examples. Pin bundling techniques offer the ability to manufacture a wide variety of cube corner geometries in a single mold. However, these techniques are economically and technically impractical for making small cube corner elements (e.g. less than about 1.0 millimeters).

In direct machining techniques, a series of grooves are formed in a unitary substrate to yield a cube-corner retroreflective surface. U.S. Pat. No. 3,712,706 (Stamm) and U.S. Pat. No. 4,588,258 (Hoopman) provide illustrative examples. Direct machining techniques can accurately produce very small cube corner elements (e.g. less than about 1.0 millimeters) which is desirable for producing a flexible retroreflective sheeting. However, it is not presently possible to produce certain cube corner geometries that have very high effective apertures at low entrance angles using direct machining techniques. By way of example, the maximum theoretical total light return of the cube corner element geometry depicted in U.S. Pat. No. 3,712,706 is approximately 67%.

In laminate techniques, a plurality of laminae, each lamina having geometric shapes on one end, are assembled together to form a cube-corner retroreflective surface. German Provisional Publication (OS) 19 17 292, International Publication Nos. WO 94/18581 (Bohn, et al.), WO 97/04939 (Mimura et al.), and WO 97/04940 (Mimura et al.), all disclose a molded reflector wherein a grooved surface is formed on a plurality of plates. The plates are then tilted by a certain angle and each second plate is shifted crosswise. This process results in a plurality of cube corner elements, each element formed by two machined surfaces and one side surface of a plate. German Patent DE 42 36 799 to Gubela discloses a method for producing a molding tool with a cubical surface for the production of high-efficiency cube corners. An oblique surface is ground or cut in a first direction over the entire length of one edge of a band. A plurality of notches are then formed in a second direction to form cube corner reflectors on the band. Finally, a plurality of notches are formed vertically in the sides of the band. German Provisional Patent 44 10 994 C2 to Gubela is a related patent.

Cube corner retroreflective sheeting is typically constructed from a substantially optically transmissive polymer base sheet having a substantially planar front surface and a plurality of cube corner elements on its back surface. The sheeting also typically includes a backing sheet that has a suitable adhesive or other means for attaching the sheeting to a desired object.

The term 'entrance angularity' is used in the retroreflective arts to describe the retroreflective efficiency of the sheeting as a function of the entrance angle of incident light, such as described in ASTM E808-94 Standard Practice for Describing Retroreflection. The entrance angularity of cube corner retroreflective sheeting is typically characterized as a function of the entrance angle of incident light measured from an axis normal to the planar surface of the sheeting and as a function of the orientation of the sheeting.

There is typically a trade-off between enhancing the entrance angularity of cube corner retroreflective sheeting at high entrance angles and the retroreflective efficiency at low entrance angles. Thus, cube corner sheeting that has been modified to enhance its entrance angularity typically suffers a degradation in its retroreflective performance in response to light incident on the sheeting at entrance angles less than about 10 to about 20 degrees from an axis normal to the sheeting. This degradation reduces the utility of the retroreflective sheeting for some applications. Thus, there is a need in the art for retroreflective sheeting that exhibits strong entrance angularity performance without suffering significant degradation in retroreflective efficiency at low entrance angles, and for manufacturing techniques for making such retroreflective sheeting.

BRIEF DESCRIPTION OF THE INVENTION

Preferred retroreflective sheeting disclosed herein has an enhanced entrance angularity without a significant reduction in retroreflective efficiency for light incident on the sheeting at relatively low entrance angles. Also disclosed are preferred methods for manufacturing such retroreflective sheeting including methods for making a master mold suitable for use in forming retroreflective sheeting from a plurality of laminae. Advantageously, master molds manufactured according to these methods enable the manufacture of retroreflective cube corner sheeting that exhibits retroreflective efficiency levels approaching 100% in response to light incident on the sheeting at relatively low entrance angles. Preferred manufacturing methods enable the manufacture of cube corner retroreflective elements having a width of about 0.050 millimeters to about 0.25 millimeters for flexibility of the sheeting. Efficient, cost-effective methods of making molds formed from a plurality of laminae are also disclosed.

In one embodiment, a method is disclosed for manufacturing a plurality of laminae for use in a mold suitable for use in forming retroreflective cube corner articles. Each lamina has opposing first and second major surfaces defining therebetween a first reference plane. Each lamina further includes a working surface connecting the first and second major surfaces. The working surface defines a second reference plane substantially parallel to the working surface and perpendicular to the first reference plane. A third reference plane is defined perpendicular to the first reference plane and the second reference plane. The method includes orienting a plurality of laminae in an assembly to have their respective first reference planes parallel to each other and disposed at a first angle relative to a first reference axis. A plurality of cube corner elements are formed on the working surfaces of the plurality of the laminae, wherein the plurality of cube corner elements have three approximately mutually perpendicular lateral faces that mutually intersect to define a cube corner element. A portion of the laminae are removed from the assembly to alter the configuration of the mold surface.

The step of forming a plurality of cube corner elements on the mold surface comprises forming two secondary groove sets that traverse the working surfaces of the plurality of laminae and that intersect to define a first base angle $\beta_1$ of the respective cube corner elements. A primary groove set is formed that extends between the major surfaces of the respective laminae and that intersect grooves of the secondary groove sets to define a second base angle $\beta_2$ and a third base angle $\beta_3$ of the respective cube corner elements. In one embodiment, a plurality of laminae are removed from the assembly to alter the configuration of the mold surface prior to forming the primary groove set.

In an alternate embodiment where the first angle is greater than zero, the cube corner elements can be formed with two groove sets. The step of forming a plurality of cube corner elements on the mold surface comprises forming a first groove set including at least two parallel adjacent V-shaped grooves in the working surface of each of the laminae. Each of the adjacent grooves defines a first groove surface and a second groove surface that intersect substantially orthogonally to form a first reference edge on each of the respective laminae. A second groove set is formed including at least one groove in the working surfaces of the plurality of laminae. Each groove in the second groove set defines a third groove surface that intersects substantially orthogonally with the first and second groove surfaces to form at least one first cube corner element. The plurality of lamina preferably are oriented to have their respective first reference planes parallel to each other and disposed at a second angle relative to the fixed reference axis prior to forming the second groove set. A plurality of the laminae can be rotated 180° about an axis perpendicular to the second reference plane. The step of removing a portion of the laminae can include removing a plurality of the laminae from the assembly and/or machining at least one major surface of a lamina.

One or more of the laminae can be rotated within the assembly 180° whereby the working surface is generally in the same plane as adjacent working surfaces. The laminae can be oriented to have their respective first reference planes parallel to each other and disposed at a first angle relative to a fixed reference axis, the plurality of laminae being held in a suitable fixture, the fixture defining a base plane. The fixed reference axis is substantially normal to the base plane. In one embodiment, the first angle measures 0°. In an alternate embodiment, the first angle measures between about 0° and about 40°, and more preferably from about 7° to about 30°.

In another embodiment, the plurality of laminae are oriented to have their respective first reference planes parallel to each other and disposed at a first angle that is greater than zero during the step of forming the plurality of cube corner elements. The plurality of laminae are reoriented after the step of forming the plurality of cube corner elements to have their respective first reference planes parallel to each other and disposed at a second angle different the first angle. The second angle is preferably less than the first angle, and most preferably zero.

The step of forming the plurality of cube corner elements comprises removing portions of the plurality of laminae proximate the working surface of the plurality of laminae. The step of removing portions of each of the plurality of laminae comprises a material removal technique selected from the group consisting of ruling, fly-cutting, grinding and milling. The adjacent grooves in a groove set can be at different depths in the working surface of the laminae. The distance between adjacent grooves in a groove set can be varied in the working surface of the laminae. A planar interface between the major surfaces is preferably maintained between adjacent laminae during the machining phase and in the subsequent mold formed therefrom so as to minimize alignment problems and damage due to handling of the laminae.

The first base angle $\beta_1$ measures between about 0° and about 60°, and more preferably between about 10° and about 45°, and most preferably between about 24° and about 40°. The primary groove set can be formed in every $n^{th}$ laminae, where n is a number greater than 1. The cube corner elements are typically arranged in opposing pairs. In an alternate embodiment, optical axes of the cube corner elements can be generally parallel to provide an asymmetrical total light return about a 360° range of orientation angles.

The step of removing a plurality of the laminae comprises removing laminae selected from the group of laminae which lack a primary groove in their respective working surfaces. The method also includes reassembling a plurality of the laminae comprising a primary groove on their respective working surfaces to form a mold surface including a plurality of cube corner element segments. The cube corner element segments preferably represent more optically active portions of the respective cube corner elements.

The present method also preferably includes replicating the working surface of the mold to form a negative copy of the plurality of cube corner elements suitable for use as a mold for forming retroreflective articles. Also disclosed is a mold comprising a negative copy of the plurality of cube corner elements manufactured according to the present method. Also disclosed is a method of forming a retroreflective sheeting comprising providing the preferred mold and forming a retroreflective sheeting in the mold.

A preferred method of manufacturing a mold suitable for forming a retroreflective cube corner article includes providing an assembly having a plurality of laminae. A plurality of cube corner elements are formed in a working surface of the plurality of laminae. A portion of each of the plurality of the cube corner elements preferably extend across a portion of two or more laminae, wherein each of the cube corner elements comprises three approximately mutually perpendicular lateral faces that mutually intersect to define a cube corner element. A plurality of laminae are removed from the assembly containing less optically active portions of the cube corner elements.

A preferred master mold suitable for use in forming cube corner articles comprises a plurality of laminae disposed adjacent one another in an assembly. The respective laminae includes a microstructured working surface that includes a plurality of cube corner element segments. Each cube corner element segment corresponds to a portion of a fully formed truncated cube corner element. The laminae preferably have a thickness of about 0.05 millimeters to about 0.25 millimeters.

A preferred retroreflective sheeting modified to exhibit enhanced retroreflective efficiency at high entrance angles while maintaining high retroreflective efficiency at low entrance angles is also disclosed, including a substrate having a base surface and a structured surface opposite the base surface. The structured surface includes a plurality of optically opposing cube corner element segments of fully formed truncated cube corner elements. The cube corner element segments comprises primarily the optically active portion of a fully formed truncated cube corner element at a design entrance angle and orientation angle.

BRIEF DESCRIPTION OF THE DRAWINGS

FIG. 15 is a top plan view of the working surface of FIG. 14.

FIG. 16 is a top plan view of a plurality of optically opposing cube corner element segments formed by removing and reorienting a plurality of laminae from the assembly depicted in FIG. 15.

FIG. 17 is a side elevation view of a group of the laminae of FIG. 16.

FIG. 18 is a top plan view of a group of the laminae of FIG. 16.

DETAILED DESCRIPTION OF THE PREFERRED EMBODIMENTS

In describing preferred embodiments of the invention specific terminology will be used for the sake of clarity. The invention, however, is not intended to be limited to the specific terms so selected and it is to be understood that each term so selected includes all technical equivalents that function similarly. Related applications filed on Jul. 2, 1997, include: Cube Corner Sheeting Mold and Method of Making the Same (U.S. Ser. No. 08/886,074, now abandoned); Retroreflective Cube Corner Sheeting Mold and Sheeting Formed Therefrom (U.S. Ser. No. 08/886,998, now issued as U.S. Pat. No. 5,981,032); Tiled Retroreflective Sheeting Composed of Highly Canted Cube Corner Elements (U.S. Ser. No. 08/887,389, now issued as U.S. Pat. No. 5,898,523); Retroreflective Cube Corner Sheeting Mold and Method for Making the Same (U.S. Ser. No. 08/887,074, pending); and Dual Orientation Retroreflective Sheeting (U.S. Ser. No. 08/887,006, now issued as U.S. Pat. No. 5,936,770).

The preferred embodiments can utilize retroreflective elements of a variety of sizes and shapes, such as full cube corner elements and truncated cube corner elements. The base edges of adjacent truncated cube corner elements in an array are typically coplanar. The base edges of adjacent full cube corner elements in an array are not all in the same plane. Full cube corner elements have a higher total light return than truncated cube corner elements for a given amount of cant, but the full cubes lose total light return more rapidly at higher entrance angles. One benefit of full cube corner elements is higher total light return at low entrance angles, without too large of a loss in performance at higher entrance angles.

Predicted total light return (TLR) for a cube corner matched pair array can be calculated from a knowledge of percent active area and ray intensity. Ray intensity may be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

Figure 1:
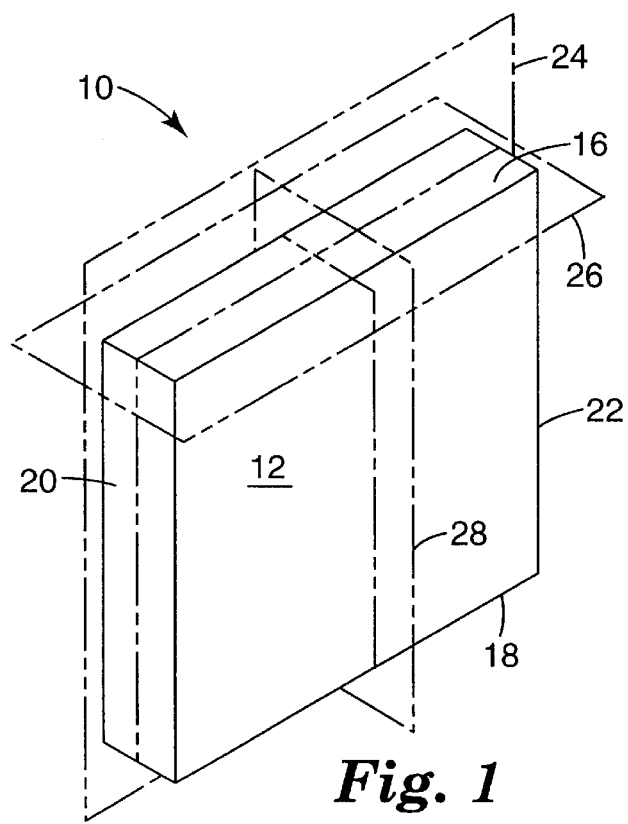
FIG. 1 is a perspective view of a single laminae suitable for use in the disclosed methods.

One preferred embodiment of a lamina, as well as a method of making the same, will now be described with reference to FIGS. 1–11. FIG. 1 depicts a representative lamina 10 useful in the manufacture of a mold suitable for forming retroreflective sheeting. Lamina 10 includes a first major surface 12 and an opposing second major surface 14. Lamina 10 further includes a working surface 16 and an opposing bottom surface 18 extending between first major surface 12 and second major surface 14. Lamina 10 further includes a first end surface 20 and an opposing second end surface 22. In a preferred embodiment, lamina 10 is a right rectangular polyhedron wherein opposing surfaces are substantially parallel. However, it will be appreciated that opposing surfaces of lamina 10 need not be parallel.

For purposes of description, lamina 10 can be characterized in three dimensional space by superimposing a Cartesian coordinate system onto its structure. A first reference plane 24 is centered between major surfaces 12 and 14. First reference plane 24, also referred to as the x-z plane, has the y-axis as its normal vector. A second reference plane 26, also referred to as the x-y plane, extends substantially coplanar with working surface 16 of lamina 10 and has the z-axis as its normal vector. A third reference plane 28, referred to as the y-z plane, is centered between first end surface 20 and second end surface 22 and has the x-axis as its normal vector. For the sake of clarity, various geometric attributes of the present embodiments will be described with reference to the Cartesian reference planes as set forth herein. However, it will be appreciated that such geometric attributes can be described using other coordinate systems or with reference to the structure of the lamina.

Preferred laminae are formed from a dimensionally stable material capable of holding precision tolerances. The laminae can be constructed from a variety of materials such as machinable plastics (e.g., polyethylene teraphthalate, polymethyl methacrylate, and polycarbonate) and metals including brass, nickel, copper, and aluminum. The physical dimensions of the laminae are constrained primarily by machining limitations. The laminae preferably measure at least 0.1 millimeters in thickness, between 5.0 and 100.0 millimeters in height, and between 10 and 500 millimeters in width. These measurements are provided for illustrative purposes only and are not intended to be limiting.

A plurality of cube corner elements having three substantially orthogonal internal dihedral angles are formed on the working surface 16 of the laminae 10. The cube corner element preferably extend across two or more laminae. By selectively removing laminae, portions of the cube corner elements are removed. A portion of a cube corner element on a single lamina that has three mutually perpendicular optical faces is referred to as a cube corner element segment. The portions of the cube corner elements removed typically do not have three mutually perpendicular optical faces, and consequently, are not cube corner element segments. The density of the more optically active cube corner element segments are concentrated to provide enhanced optical properties. A planar interface between major surfaces 12, 14 is maintained between adjacent laminae during the machining phase and in the subsequent mold formed therefrom so as to minimize alignment problems and damage due to handling of the laminae.

Figure 2:
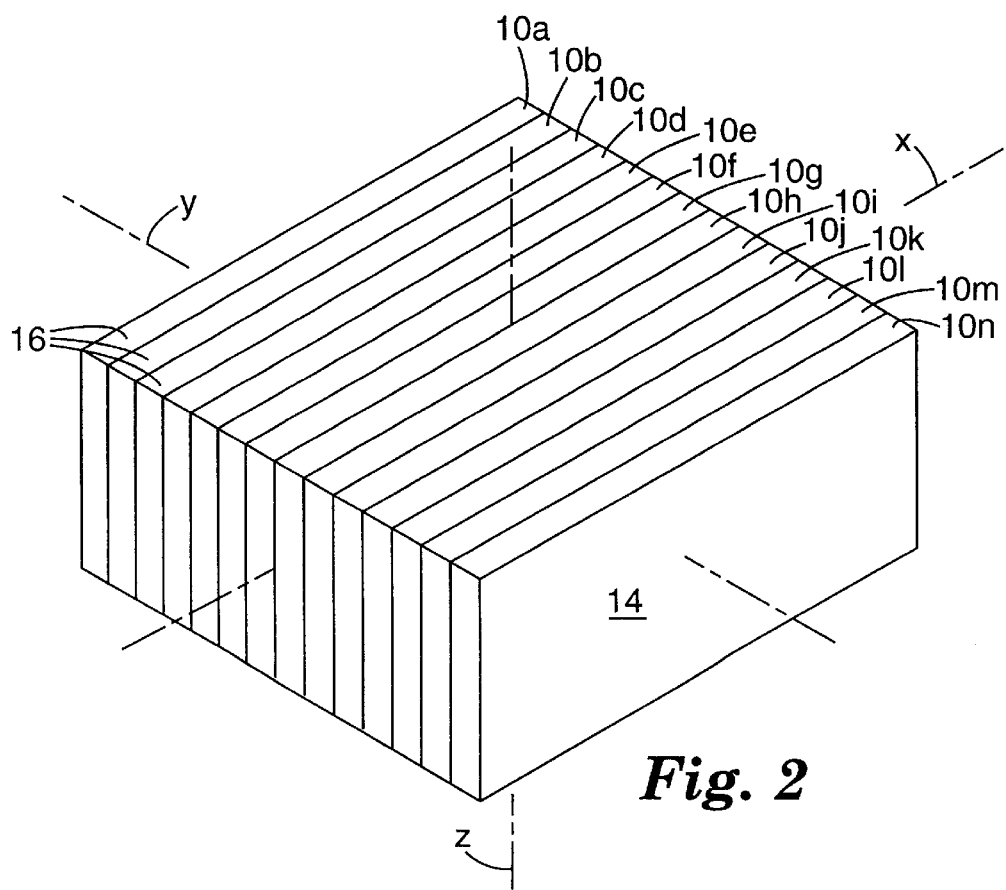
FIG. 2 is a perspective view of a plurality of laminae.

FIGS. 2–9 present a method for forming a plurality of laminae suitable for use in a mold suitable for forming retroreflective articles. In brief summary, a plurality of cube corner elements are formed in the working surfaces of a plurality of laminae with the laminae secured in an assembly. The plurality of laminae 10a–10n (collectively referred to herein by reference numeral 10) are preferably assembled such that their respective working surfaces 16 are substantially co-planar and their respective major planes are disposed at a first angle relative to a first reference axis 79 perpendicular to the base plane 81. In the embodiment of FIG. 2, the first angle is zero and the working surfaces 16 are perpendicular to the fixed reference axis 79.

Figure 7:
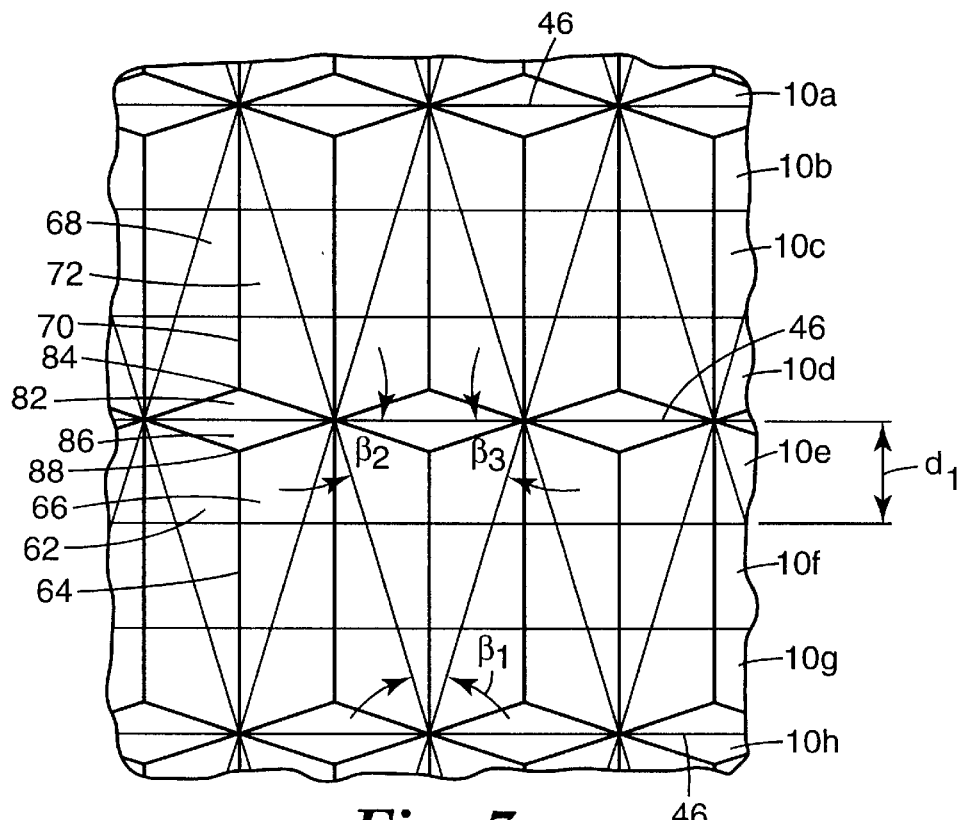
FIG. 7 is a top plan view of the working surface of FIG. 6 following the formation of a third groove set that forms a plurality of cube corner elements in the working surface.
Figure 9:
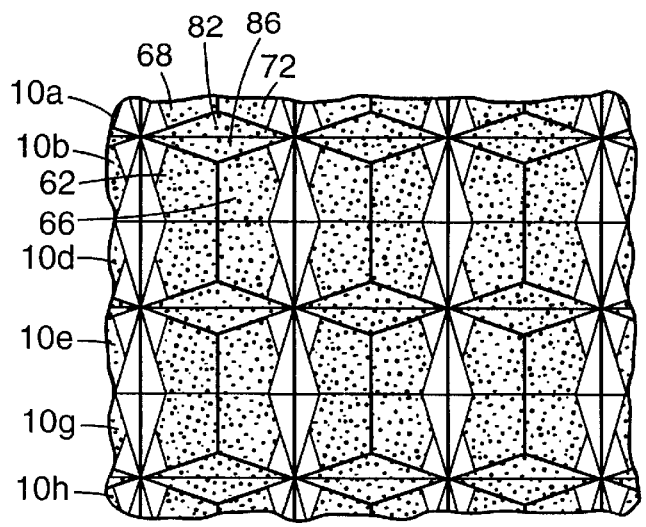
FIG. 9 is a top plan view of a plurality of optically opposing cube corner element segments formed by removing a plurality of laminae from the assembly depicted in FIG. 8.

First and second groove sets, each preferably comprising a plurality of parallel, adjacent V-shaped grooves is formed in the working surface 16 of the plurality of laminae 10 to provide a structured surface having a plurality of four-sided pyramids (FIGS. 3–6). A third groove set comprising a plurality of V-shaped grooves is formed in the working surface 16 of a plurality of laminae 10. Formation of the third groove set results in a structured surface that includes a plurality of fully formed truncated cube corner elements on the working surface of the plurality of laminae 10 (FIG. 7). A plurality of the laminae 10 are then removed from the assembly and the remaining laminae 10 are reassembled to provide a mold surface having a plurality of cube corner element segments that correspond to a portion of the fully formed cube corner elements (FIG. 9). Alternatively, the first and/or second major surfaces 12, 14 can be machined so that substantially only the fully formed cube corner element segments of FIG. 9 remain. Preferably, the cube corner element segments correspond to the more optically active portions of the fully formed cube corner elements. Alternatively, the plurality of laminae can be removed after machining the first and second groove sets, but before machining the third groove set.

The embodiment illustrated in FIGS. 2–9 will now be described in greater detail. Referring to FIGS. 1–2, a plurality of thin laminae 10 are assembled together such that the first major surface 12 of one laminae 10 is adjacent the second major surface 14 of an adjacent laminae 10. Preferably, the plurality of laminae 10 are assembled in a fixture capable of securing the plurality of laminae adjacent one another. Details of the fixture are not critical to the present invention. For purposes of description, however, the fixture preferably defines a base plane which, in a preferred embodiment, is substantially parallel to the bottom surfaces 18 of the respective laminae 10 when the laminae 10 are positioned as depicted in FIG. 2. The plurality of laminae 10 can be characterized in three dimensional space by a Cartesian coordinate system as superimposed in FIG. 2. Preferably, the respective working surfaces 16 of the plurality of laminae 10 are substantially coplanar when the laminae are positioned with their respective first reference planes 24 perpendicular to the base plane.

Figure 3:
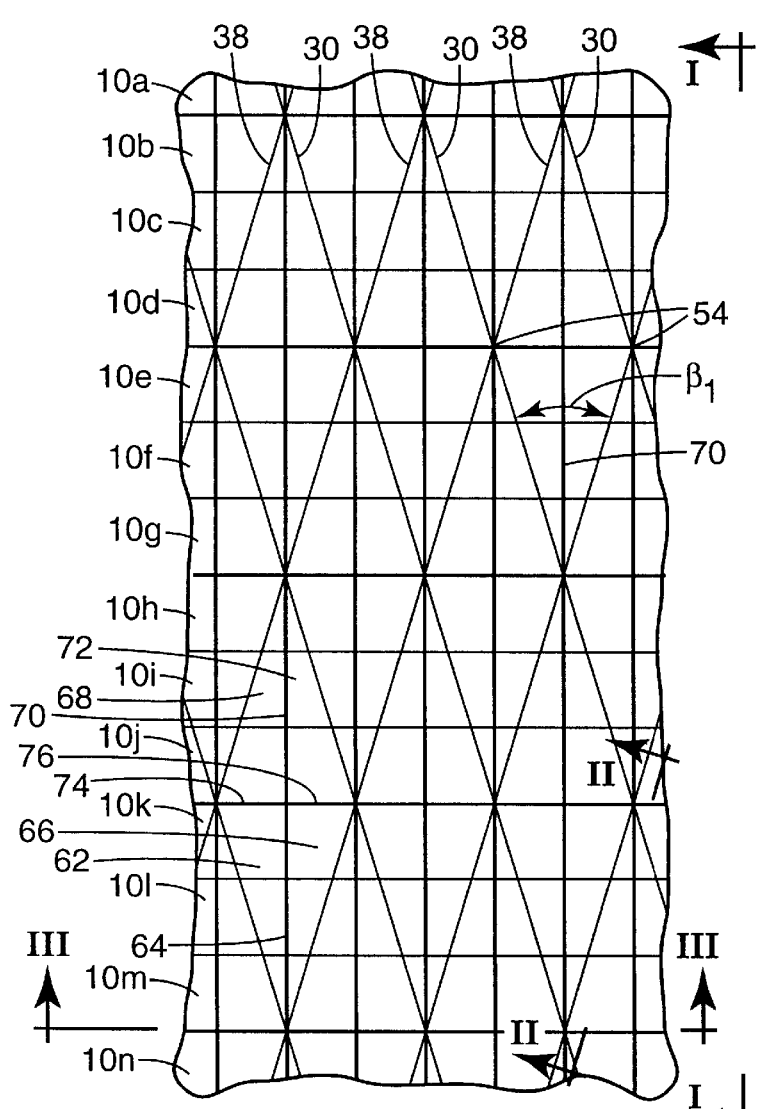
FIG. 3 is a top plan view of the working surface following the formation of two groove sets.
Figure 4:
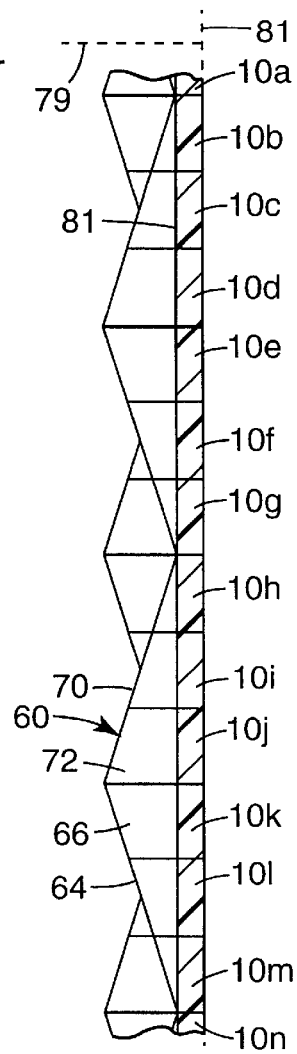
FIG. 4 is a side elevation view, taken through plane I—I, of the working surface depicted in FIG. 3.
Figure 5:
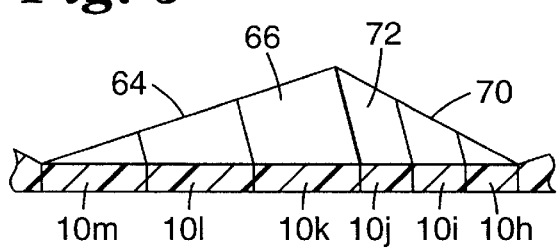
FIG. 5 is a side elevation view, taken through plane II—II, of the working surface depicted in FIG. 3.
Figure 6:
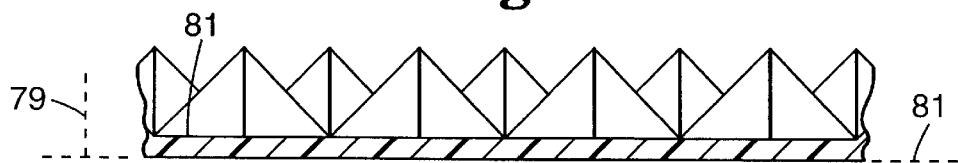
FIG. 6 is a cross-sectional view, taken through plane III—III, of the working surface depicted in FIG. 3.

Referring to FIG. 3, a first groove set comprising a plurality of parallel adjacent generally V-shaped grooves 30 are formed in the working surfaces 16 of the plurality of laminae 10. A second groove set comprising a plurality of parallel adjacent generally V-shaped grooves 38 are formed in the working surfaces 16 of the plurality of laminae 10. The grooves 38 intersect the grooves 30 at a plurality of intersection locations 54 on the working surfaces 16 of the plurality of laminae 10. Intersection locations 54 are disposed approximately along the edge of the working surface 16 of the respective laminae 10. Alternatively, some of the laminae can be combined into a single lamina. For example, laminae 10a, 10b; 10d, 10e; and 10g, 10h can be combined so that the intersection locations 54 is approximately in the center of the combined laminae.

Grooves 30 and 38 are formed by removing portions of working surface 16 of the plurality of laminae using an appropriate material removal technique. The invention contemplates the use of a wide variety of material removal techniques including precision machining techniques such as milling, ruling, and fly-cutting. Also contemplated is the use of chemical etching or laser ablation techniques. According to one embodiment, grooves 30 of the first groove set are formed in a high-precision machining operation in which a diamond cutting tool having a 84.946° included angle is repeatedly moved transversely across the working surfaces 16 of the plurality of laminae 10 along axes substantially parallel to base plane 81. Similarly, grooves 38 of second groove set are formed by moving a diamond cutting tool having a 84.946° included angle transversely across the working surfaces 16 of the respective laminae along axes substantially parallel to the base plane 81 that intersect the grooves 30 of first groove set at an included angle $\beta_1$ of approximately 33.06°. It will be appreciated, however that the diamond cutting tool can be moved along an axis that is non-parallel to the base plane 81 such that the tool cuts at a varying depth across the plurality of laminae 10. It will also be appreciated that the machining tool can be held stationary while the plurality of laminae are placed in motion; any relative motion between the plurality of laminae 10 and the machining tool is contemplated.

Formation of first groove set 30 and second groove set 38 results in a structured surface comprising a repeating pattern of four-sided pyramidal structures 60 (see FIG. 4) on the working surfaces 16 of the plurality of laminae 10. Grooves 30, 38 are formed such that surfaces 62, 66 of the structures 60 intersect along a common edge 64 to define a substantially orthogonal internal dihedral angle between the surfaces. Similarly, surfaces 68, 72 intersect along a common edge 70 to define a substantially orthogonal internal dihedral angle between the surfaces. In the cube corner retroreflective arts the relationship between these surfaces is commonly referred to as a mutually perpendicular relationship. The language approximately mutually perpendicular or substantially mutually perpendicular is commonly used to allow for slight deviations from perfect orthogonality useful for modifying the distribution of retroreflected light as disclosed in U.S. Pat. No. 4,775,219 to Appeldorn, et al. Importantly, surfaces 62, 66, 68 and 72 extend across the working surfaces of at least a portion of two laminae. Additionally, it will be noted that surfaces 62 and 68 also intersect along a common edge 74 and that surfaces 66 and 72 intersect along common edge 76. As noted above, by combining some of the laminae, common edges 74 and 76 of the respective structures can be centered approximately between the major surfaces 12, 14 of the respective laminae on which they are disposed.

A third groove set illustrated in FIG. 7 comprises a plurality of grooves 46 formed in the working surfaces 16 of a plurality of the laminae in the stack. Addition of the third groove set forms a plurality of fully formed truncated cube corner elements on the working surfaces 16 of the plurality of laminae 10. A portion of the cube corner elements preferably extend across several laminae. Altering the location and groove angles of the grooves 46 permits the manufacture of varying cube corner element geometries. One embodiment is illustrated in FIG. 7, in which a plurality of substantially V-shaped grooves are formed along an axis that is substantially parallel, and preferably coaxial with, the axes along which the respective common edges 74 and 76 extend illustrated in FIG. 3. The V-shaped grooves are preferably formed using suitable material removal techniques as described above. In one embodiment grooves 46 are formed by moving a diamond cutting tool having a 34.528° included angle along an axis coaxial with the axes along which the respective common edges 74 and 76 extend and substantially parallel to the laminae edges.

Formation of the third groove set provides a plurality of optically opposing cube corner elements 80a, 80b on the working surfaces 16 of the plurality of laminae 10. In the disclosed embodiment, cube corner elements 80a and 80b are substantially identical in shape and size, but are disposed at 180° orientations relative to one another. Cube corner elements 80a have three mutually perpendicular optical faces: two optical faces formed by surfaces 62 and 66, and a third optical face 86 corresponding to one surface of the third groove 46. The bottom edges of faces 62, 66 and 86 define base triangles having included angles $\beta_1$, $\beta_2$, and $\beta_3$. Optical faces 62, 66 and 86 mutually intersect at a cube corner element peak 88. Alternatively, the surface 62, 66, 86 do not necessarily need to intersect in a peak. Rather, a plateau or flat region can be formed that permits light to be transmitted through the retroreflective sheeting. Cube corner elements 80b have three mutually perpendicular optical faces: two optical faces formed by surfaces 68 and 72, and a third optical face 82 corresponding to the opposite side of the third groove 46. The bottom edges of faces 68, 72 and 82 define base triangles having included angles $\beta_1$, $\beta_2$, and $\beta_3$. Optical faces 68,72 and 82 mutually intersect at a cube corner element peak 84.

In the embodiment described herein, base angle $\beta_1$ measures 33.06°, base angle $\beta_2$ measures 73.47° and base angle $\beta_3$ measures 73.47°. Cube corner elements with nonequilateral base triangles are commonly referred to in the cube corner arts as 'canted' cube corner elements. The nomenclature 'forward canting' or 'positive canting' has been used in the cube corner arts to describe cube corner elements canted in a manner that increases base angle $\beta_1$. Conversely, the nomenclature 'backward canting' or 'negative canting' has been used in the cube corner arts to describe cube corner elements canted in a manner that decreases base angle $\beta_1$. See U.S. Pat. Nos. 5,565,151 (Nilsen) and U.S. Pat. No. 4,588,258 (Hoopman).

Backward canted cube corner elements can be further characterized in that only one included angle of the cube corner element base triangle measures less than 60°. The other two included angles measure at least 60°. By contrast, forward canted cubes can be characterized in that two of the included angles of the base triangle measure less than 60° and a single base triangle included angle measures greater than 60°. It will be understood that the particular geometry discussed herein relate to a preferred embodiment. Those of ordinary skill in the relevant arts will understand that varying degrees of canting and varying cube sizes can also be used. Insubstantial changes in cube geometries yielding substantially the same optical results should be considered within the scope of the invention.

Canting cube corner elements either backward or forward enhances entrance angularity. Canting the cube corners in the backward direction elongates optical faces 62, 66 and reduces base angle $\beta_1$. Additionally, canting cube corner elements 80 in the backward direction improves the entrance angularity performance of the cube corner elements 80 in at least the plane substantially parallel with common edges 64 and 70. As will be discussed below, the more optically active portions of the cube corner elements 80 are generally concentrated along selected laminae. This property has utility in retroreflective sheeting applications designed to retroreflect light incident on the sheeting at high entrance angles. Alternatively, the base angles $\beta_1$, $\beta_2$ and $\beta_3$ can all be different (scalene triangles), such as disclosed in WO 96/42024 (Smith et al.).

Figure 8:
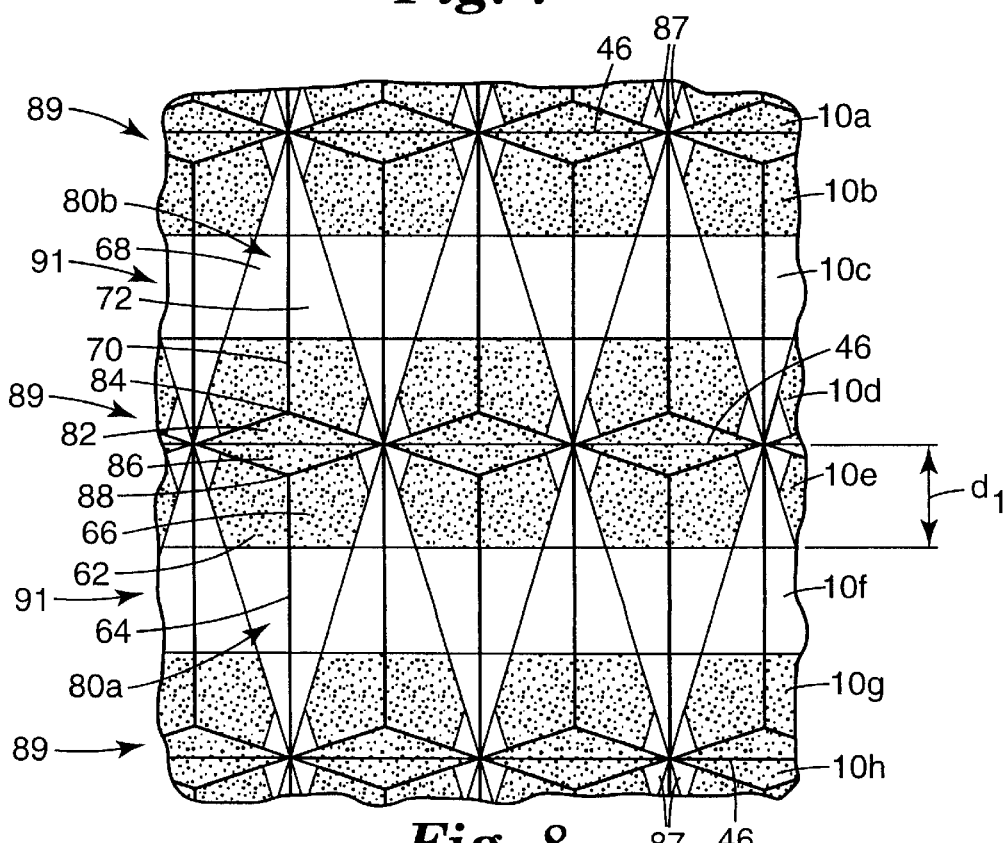
FIG. 8 is a top plan view of the plurality of cube corner elements depicted in FIG. 7, shaded to illustrated the more optically active portions thereof at a design entrance angle and orientation angle.

FIG. 8 is a general representation of the cube corner elements depicted in FIG. 7 shaded to illustrate the more optically active portions 89 of the cube corner elements at an entrance angle from about 0° to about 45°. The more optically active portions 89 of the cube corner elements (cube corner element segments) are concentrated adjacent to the third groove 46, while the less optically active portions 91 of the cube corner elements are displaced from third groove 46. The more optically active portions 89 can include less optically active regions 87 located near the angles $\beta_2$, $\beta_3$. FIG. 8 illustrates that a relatively small portion of the cube corner elements depicted in FIG. 7 are optically active. As the entrance angle decreases toward zero, the area of the more optically active portions 89 and the effective aperture of that region decreases. At some level, the effective aperture becomes a slit aperture, diffracting light leaving the retroreflective article primarily in a plane containing the optical axis of the cube corner element and perpendicular to the slit.

FIG. 9 presents a top plan view of a plurality of optically opposing cube corner element segments formed by removing a plurality of laminae (10c and 10f) from the assembly depicted in FIG. 8. The cube corner element segments are arranged in matched pairs defined by portions of the three substantially mutually perpendicular surfaces 62, 66 and 86 and by portions of surfaces 68, 72 and 82. In an alternate embodiment, the laminae 10c, 10f can be contiguous with one of the adjacent laminae, such as for example 10b and 10e respectively. The portion of the laminae 10b, 10e corresponding to 10c and 10f can be removed by machining, such as a planarization operation.

In one preferred embodiment, the plurality depicted in FIG. 9 results from removing from the assembly those laminae which have the less optically active portions of the cube corner element segments disposed on their respective working surfaces. The laminae removed from the assembly 10c, 10f are referred to herein as sacrificial laminae. In one embodiment, sacrificial laminae are removed from the assembly and the remaining laminae are reassembled in a suitable fixture to provide a structured surface comprising a plurality of cube corner element segments that correspond to the more optically active portions of the fully formed cube corner elements formed in the working surfaces of the plurality of laminae in the original assembly. Because the less optically active portions of the cube corner element segments are removed, a retroreflector formed as a replica of this mold can exhibit substantially higher retroreflective efficiency than the retroreflector formed as a replica of the surface of the original assembly across a wide range of entrance angles. As discussed above, the laminae 10c, 10f can optionally be removed from the assembly prior to forming the third groove set 46. A planar interface between the major surfaces 12, 14 of adjacent laminae is preferably maintained during the machining phase and in the subsequent mold formed therefrom so as to minimize alignment problems and damage due to handling of the laminae.

After the sacrificial laminae 10c, 10f are removed, the optically active portion 89 of the cube corner element 80a has a tetragonal base with a first side defined by a groove vertex 46, a second virtual side opposite the first side defined by the intersection of laminae 10e and 10g, and opposing third and fourth sides defined by grooves 30, 38 connecting the first and second sides. The first and second mutually tetragonal optical faces 62, 66 extend from the respective third and fourth sides 30, 38 of the base and intersect along a common edge 64 to define an approximately perpendicular dihedral angle. The triangular optical face 86 extends from the first side of the base disposed approximately perpendicular to the tetragonal optical faces 62, 66. The triangular optical face 86 together with the first and second mutually tetragonal optical faces 62, 66 define a cube corner element segment.

The optically active portion 89 of the cube corner element 80b has a tetragonal base having a first side defined by a groove vertex 46, a second virtual side opposite the first side defined by the intersection of laminae 10b and 10d, and opposing third and fourth sides defined by grooves 30, 38 connecting the first and second sides. The first and second mutually tetragonal optical faces 68, 72 extend from the respective third and fourth sides 30, 38 of the base and intersect along a common edge 70 to define an approximately perpendicular dihedral angle. The triangular optical face 82 extends from the first side of the base disposed approximately perpendicular to the tetragonal optical faces 68, 72. The triangular optical face 82 together with the first and second mutually tetragonal optical faces 68, 72 define another cube corner element segment.

Figure 10:
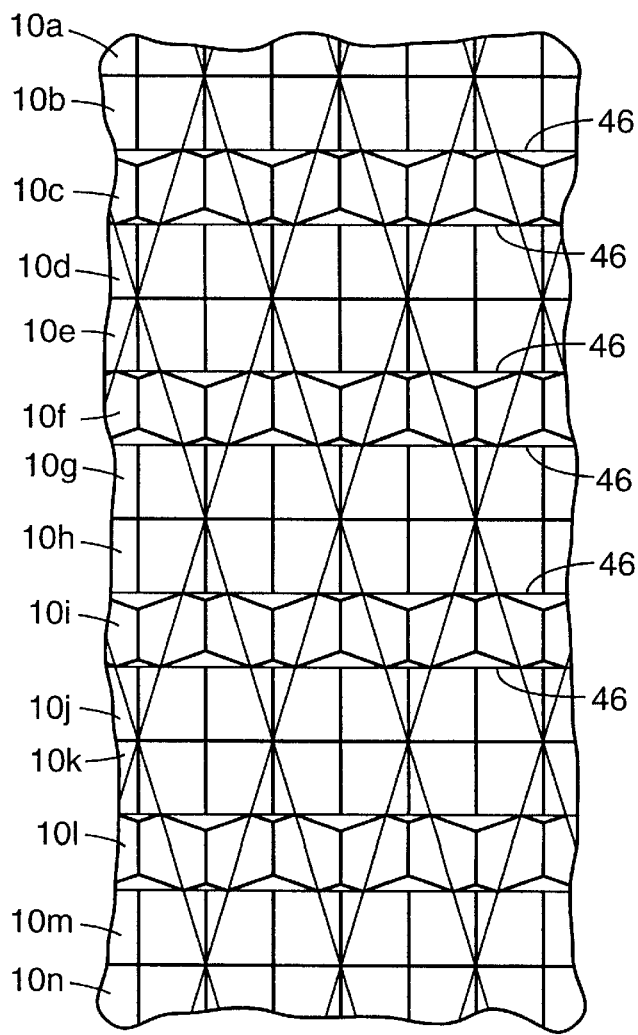
FIG. 10 is a top plan view of the working surface of FIG. 6 following the formation of a third groove set that forms a plurality of cube corner elements in the working surface according to an alternate embodiment.

FIG. 10 presents a top plan view of the working surface of FIG. 3 following the formation of a third groove set that forms a plurality of cube corner elements in the working surface according to an alternate embodiment of the invention. It will be appreciated that grooves 46 of the third groove set can be formed along axes displaced from the axes that contain edges 74, 76, as in FIGS. 7–9. In the embodiment of FIG. 10 the grooves 46 of the third groove set are formed along axes substantially coincident with the major surfaces 12, 14 of every third laminae 10 (10c, 10f, 10i, 10l). This results in a structured surface in which every third laminae 10 includes a plurality of optically opposing cube corner elements segments disposed adjacent one another along the working surface of the laminae. The remaining laminae (10a, 10b, 10d, 10e, 10g, 10h, 10j, 10k, 10m, 10n) can be considered sacrificial and can be removed from the assembly to provide a working surface comprising a plurality of optically opposing cube corner elements .

In the embodiment depicted in FIG. 10, the grooves 46 of the third groove set are formed by moving a diamond cutting tool with a half angle of about 17.264° included angle that is asymmetric about a vertical axis across the working surface 16. The grooves can alternately be formed with a tool that is symmetric about its vertical axis, resulting in cutting away portions of the working surface of the sacrifical laminae 10b, 10d, 10e, 10g, 10h, 10j, 10k, 10m. As discussed above, some of the laminae, such as 10a, 10b, can be combined into a single lamina.

Figure 11:
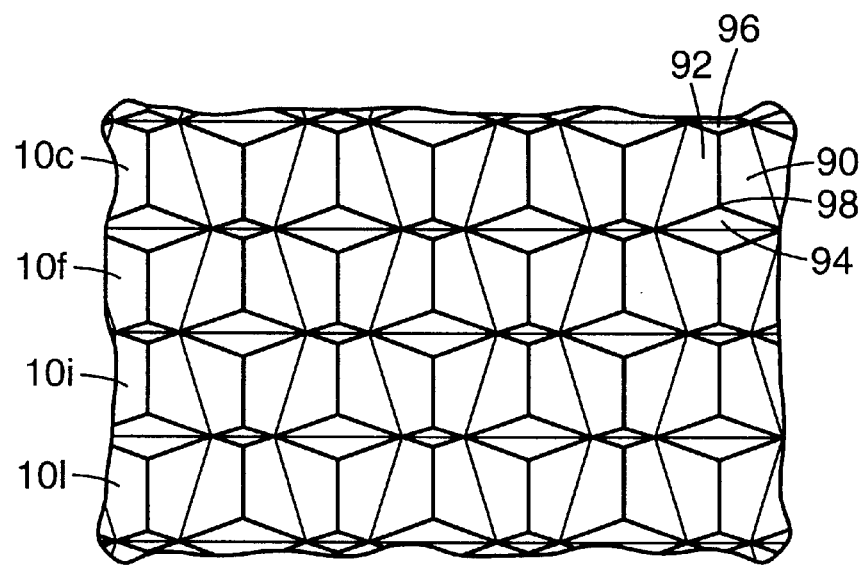
FIG. 11 is a top plan view of a plurality of optically opposing cube corner element segments formed by removing a plurality of laminae from the assembly depicted in FIG. 10.

FIG. 11 is a top plan view, similar to FIG. 9, of a plurality of optically opposing cube corner element segments formed by removing the sacrificial laminae (10a, 10b, 10d, 10e, 10g, 10h, 10j, 10k, 10m, 10n) from the assembly depicted in FIG. 10. The cube corner element segments depicted in FIG. 11 include three substantially mutually perpendicular optical faces 90, 92, 94 that meet at a cube corner peak 98 and a fourth face 96 that need not be mutually perpendicular to optical faces 90 and 92.

As the included angle of the third groove set 46 decreases, it become increasingly difficult to machine the groove set 46, in part, due to the cutting tool becoming increasingly narrow and subject to breakage. Therefore, the present sacrificial laminae machining method is particularly useful for forming highly canted cube corner elements since a wider tool can be used without regard to the impact on the sacrificial laminae 10a, 10b, 10d, etc. The wider tool can either be asymmetrical in construction or tilted relative to the working surface 16 to form the groove set 46.

Highly canted cube corner elements have the advantage that as the canting of the cube corner elements increases, the less optically active regions 87, 141 decrease. On the other hand, the diffraction within the slit aperture directs the reflected light primarily in one plane and degrades uniformity of the divergence profile of the retroreflected light, as discussed in ASTM E808-94.

FIGS. 12–18 illustrate another embodiment, in which the working surfaces of the plurality of laminae 100 are machined with the laminae tilted such that side surfaces 134 are disposed at an angle θ from a first reference axis 106 normal to base plane 104. Tilting creates a more symmetrical aperture in the finished cube corner element segment and hence reduces diffraction non-uniformities. The working surfaces 102 are preferably parallel, but not coplanar. The laminae 100 comprise alternating layers of relatively thin laminae 100a, 100c, 100e about one third the thickness of relatively thick laminae 100b, 100d, 100f assembled together, although the thickness can vary. Preferably, the plurality of laminae 100 are assembled in a fixture capable of securing the plurality of laminae adjacent one another. The plurality of laminae 100 can be characterized in three dimensional space by a Cartesian coordinate system such as shown in FIG. 1. As will be discussed below, the laminae 100b, 100d, 100f are the sacrificial portions that will ultimately be removed from the assembly.

Figure 12:
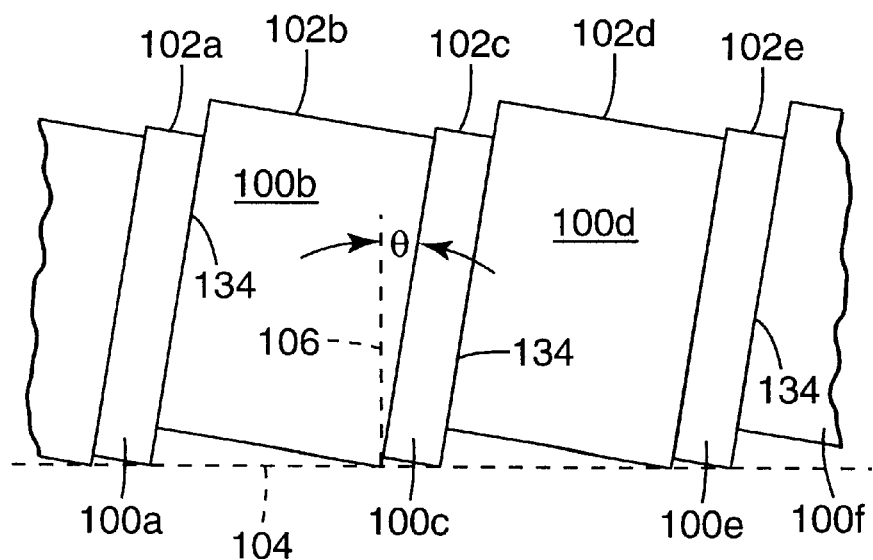
FIG. 12 is side elevation view of a plurality of laminae for use in a method according to an alternate embodiment.
Figure 13:
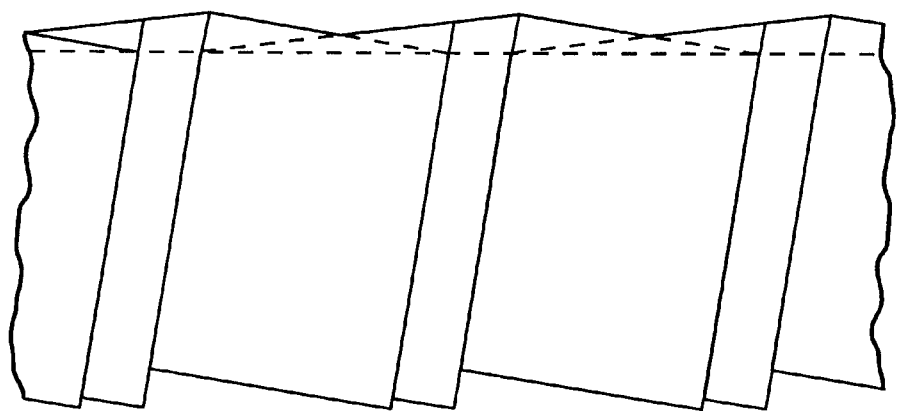
FIG. 13 is a side elevation view of the laminae of FIG. 12 following the formation of two groove sets in the working surface.
Figure 14:
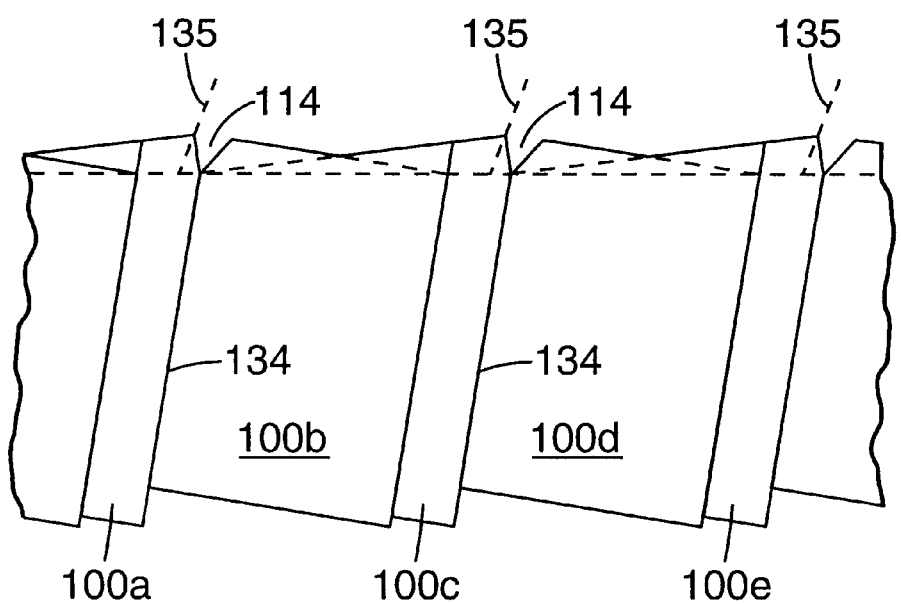
FIG. 14 is a side elevation view of the laminae of FIG. 13 following the formation of a third groove set in the working surface.

FIG. 13 is a side elevation view of the laminae 100 of FIG. 12 following the formation of two groove sets in the working surfaces 102. FIG. 14 is a side elevation view of the laminae 100 of FIG. 13 following the formation of a third groove set in the working surface 102. Tilting the laminae 100 tilts the symmetry axes 135, resulting in highly canted cube corner elements 124 during the intermediate machining phase. When the tilt angle is later reduced, the cant of the cube corner element segments is reduced. As with the embodiments discussed above, the third groove set can be machined after removal of the sacrificial laminae 100b, 100d, 100f.

FIG. 15 is a top plan view of the working surfaces 102 of FIG. 14. The first, second and third groove sets comprise a plurality of parallel adjacent generally V-shaped grooves 110, 112, 114 formed in the working surfaces 102 of the plurality of laminae 100. The grooves 110, 112, 114 preferably intersect at a plurality of intersection locations 116 on the working surfaces 102 of the plurality of laminae 100. Preferably, the third groove set 114 and intersection locations 116 are disposed along a side surface 134 of the working surfaces 102a, 102c, 102e of the thin laminae 100a, 100c, 100e (see FIG. 14).

Alternatively, all three grooves 110, 112, 114 need not intersect at one location, so that a flat region or plateau is formed for transmitting light through the retroreflective sheeting. The V-shaped grooves are preferably formed using suitable material removal techniques as described above, such as moving a diamond cutting tool across the working surface 16. The grooves 110, 112 are preferably formed using a tool with an included angle of about 86.147° and the tool for the grooves 114 preferably has an included angle of about 30.048°. Since the laminae 100b, 100d, 100f are ultimately removed from the assembly, damage to the working surfaces 102b, 102d, 102f will not impact the optical properties of the retroreflective articles made from the present mold.

The grooves 110, 112 are formed such that surfaces 120, 122 of the structure 124 intersect along a common edge 126 to define a substantially orthogonal internal dihedral angle there between. The grooves 114 provide a third optical face 140 on the cube corner element 124. Optical faces 120, 122, 140 intersect at a cube corner peak 144 to form three mutually perpendicular optical faces of a fully formed truncated cube corner element 124. Faces 128, 130, 142 intersect at a peak 146, but do not necessarily form three mutually perpendicular optical faces since that portion of the assembly will be discarded. The bottom edges of the faces 120, 122, 140 define base triangles having included angles $\delta_1$, $\delta_2$, $\delta_3$, where $\delta_1$ measures 29.066° and $\delta_2$, $\delta_3$ each measure 75.467°.

FIG. 15 is shaded to illustrate the actual active aperture of the cube corner elements 124 at a design entrance angle and a design orientation angle, in response to 0° entrance angle light. The shape of the active aperture will change when the degree of tilt is reduced. The included angle formed by the groove 114 reduces the size of the optical surface 140 and narrows the more optically active portion of the cube corner element 124. Portions 143 of the cube corner element 124 are less optically active than the cube corner element segments 132. The cube corner element segments 132 can include less optically active portions 141.

FIGS. 16–18 present a plurality of optically opposing cube corner element segments formed by removing a plurality of laminae (100b, 100d, 100f) from the assembly depicted in FIG. 15 and tilting the remaining laminae 100a, 100c, 100e upright and parallel to the reference axis 106. Alternatively, for example, the laminae 100a, 100b can be a single lamina and the portion 100b can be removed by machining, such as a planarization operation. The cube corner element 132 is shaded to illustrate the more optically active portions. The cube corner element segments 132 on the remaining laminae 100a, 100c, 100e are generally the most optically active portions of the cube corner elements 124 remaining. As best seen in FIG. 17, the laminae 100a and 100e can be oriented vertically and rotated 180 degrees so as to form matched pairs of cube corner retroreflective element segments, while maintaining a planar interface therebetween. Reorienting the laminae 100a, 100e vertically has the added advantage of orienting the optical axes 135 more vertically, resulting in negative or backward canted cube corner elements.

The remaining laminae are reassembled in a suitable fixture to provide a structured surface comprising a plurality of cube corner element segments that correspond to the more optically active portions of the fully formed cube corner elements 124 formed in the working surfaces of the plurality of laminae in the original assembly. Because the less optically active portions of the cube corner element segments are removed, a retroreflector formed as a replica of this mold can exhibit substantially higher retroreflective efficiency than a retroreflector formed as a replica of the surface of the original assembly across a wide range of entrance angles.

In an alternate embodiment, the laminae 100a and 100e are not rotated so that the optical axes 135 of the cube corner elements 132 are generally parallel. The total light return for cube corner elements 132 aligned in the same direction is asymmetrical about a 360° range of orientation angles. An asymmetrical retroreflection pattern may be desirable for some applications, such as pavement markers or other items that are viewed from a narrow range of orientation angles.

Figure 19:
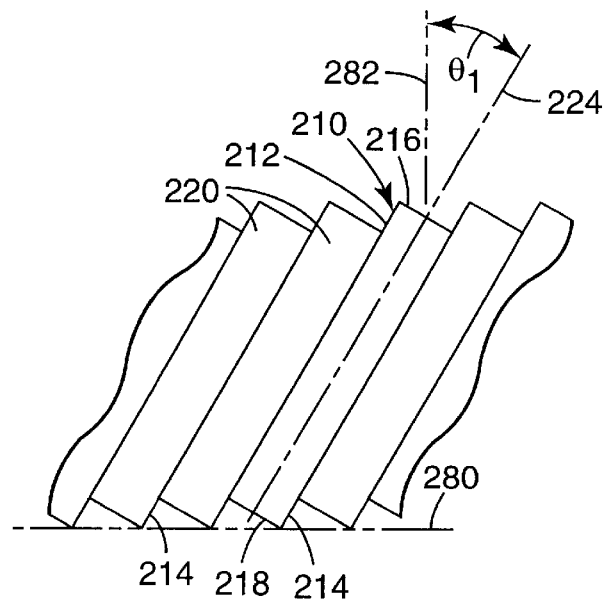
FIG. 19 is an end view of the plurality of laminae oriented in a first orientation.
Figure 20:
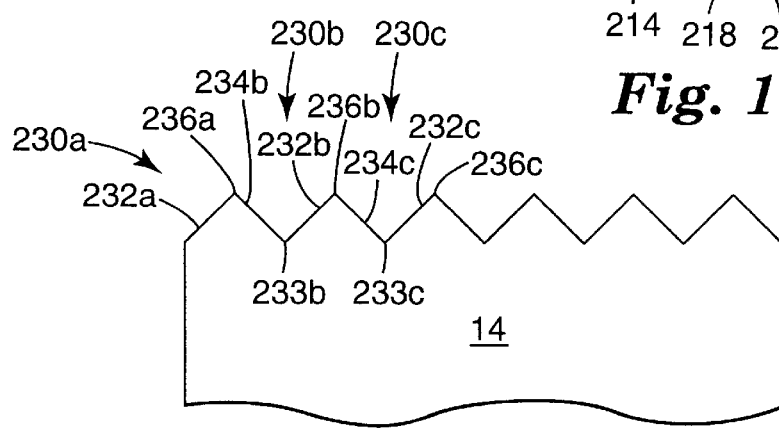
FIG. 20 is a side view of the plurality of laminae following a first machining operation.
Figure 21:
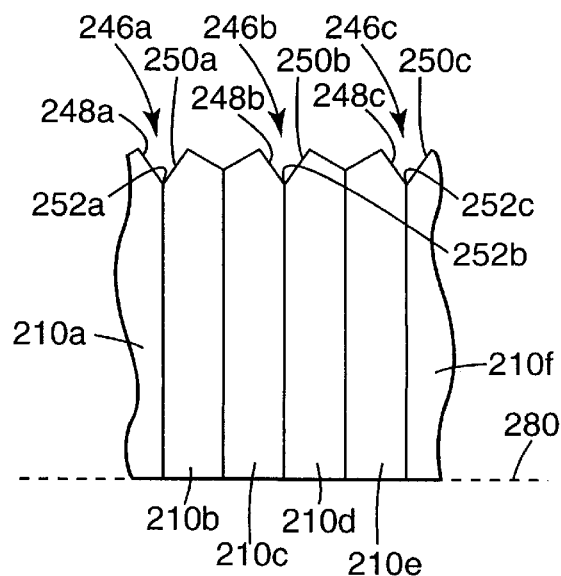
FIG. 21 is an end view of the plurality of laminae following a second machining operation.

FIGS. 19–21 illustrate a method of forming a plurality of cube corner elements with two groove sets, rather than three, as disclosed in related application filed on the same date herewith entitled Retroreflective Cube Corner Sheeting Mold and Method for Making the Same (U.S. Ser. No. 08/887,074 pending). The plurality of laminae 210 are oriented to have their respective first reference planes 224 disposed at a first angle $\theta_1$, from a fixed reference axis 282 normal to base plane 280. A first groove set comprising a plurality of parallel adjacent V-shaped grooves 230 is formed in the working surfaces 216 of the plurality of laminae 210 with the lamina disposed at angle $\theta_1$. At a minimum, at least two adjacent grooves 230 are formed in working surface 216 of the plurality of laminae 210. The grooves 230a, 230b, 230c, etc. (collectively referred to as 230) define first groove surfaces 232a, 232b, 232c, etc. (collectively referred to as 232) and second groove surfaces 234b, 234c, 234d, etc. (collectively referred to as 234) that intersect at groove vertices 233b, 233c, 233d, etc. (collectively referred to as 233) as shown. Groove surfaces 232a and 234b of adjacent grooves intersect approximately orthogonally along a reference edge 236a. Similarly, adjacent groove surfaces 232b and 234c preferably intersect approximately orthogonally along reference edge 236b. This geometry can result from forming grooves 230 using a cutting tool having a 90° included angle. Preferably this pattern is repeated across the entire working surfaces 216 of the plurality of laminae 210. The respective groove vertices 233 preferably have a spacing between about 0.01 millimeters and about 1.0 millimeters, however these dimensions are not intended to be limiting.

The grooves 230 of the first groove set are formed at a depth such that the respective first reference edges 236 intersect the first major surface 212 and the second major surface 214 of each lamina. Alternatively, grooves 230 having lesser depths can be formed. For example, if the depth of the tool is decreased, the groove vertices 233 will be closer to the working surface 216 and flat, transmissive regions will be formed.

To complete the formation of cube corner elements on the working surfaces 216 of the respective laminae 210, a second groove set is formed by machining one or more grooves 246 in each lamina 210 along an axis substantially parallel with first reference plane 224. According to one embodiment of the invention illustrated in FIG. 21, the plurality of lamina 210 are disposed at a second angle parallel to the fixed reference axis 282 prior to forming the second groove set. Additionally, the laminae can be removed from the assembly and the major surfaces 212, 214 machined to remove the less optically active portion. Alternating laminae (210b, 210d, 210f, etc.) can be rotated 180° about an axis perpendicular to second reference plane 226 or to base plane 280 and the plurality of laminae are then reassembled with their respective first reference planes 224 preferably disposed substantially perpendicular to base plane 280. In an alternate embodiment, the second groove set 246 is formed at a location such that some of the laminae are more optically active than others. The less optically active laminae are then preferably removed from the assembly.

Figure 22:
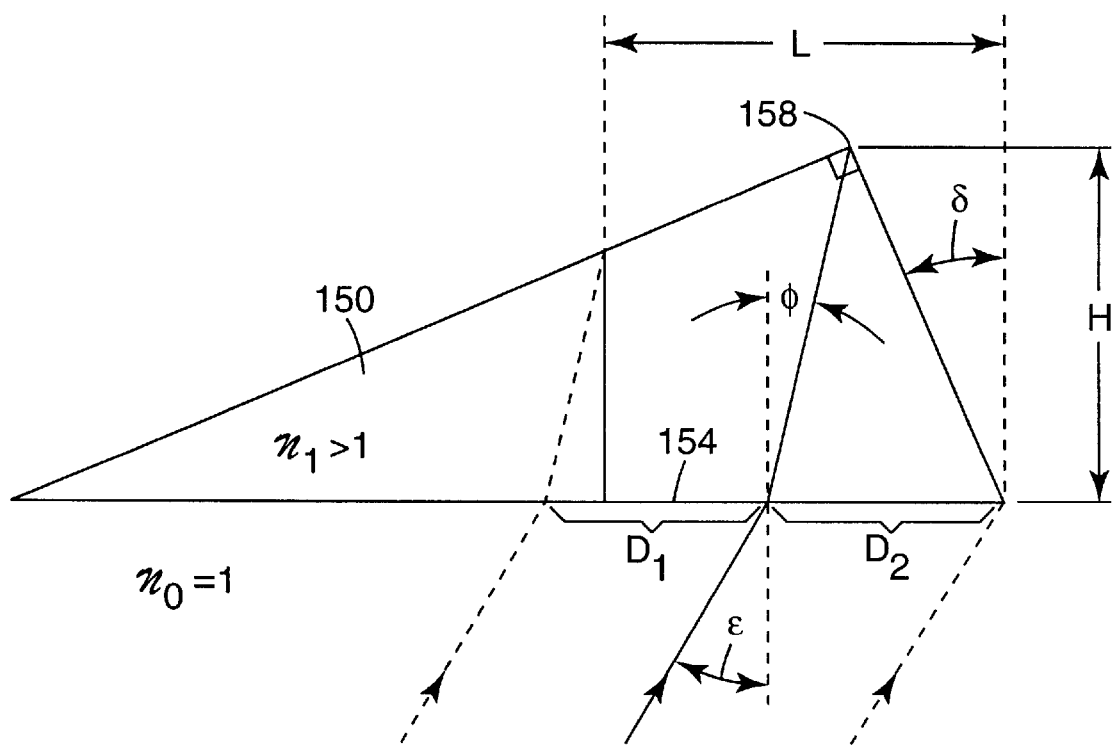
FIG. 22 is a schematic illustration of an exemplary cube corner element.

FIG. 22 schematically illustrates one possible relationship between the thickness "L" of a laminae and the geometry of a cube corner element 150. The tool half angle δ forms one of the groove sets, ε is the entrance angle, and φ is the ray entrance angle after refraction. "H" is the height of the cube corner element 150. The thickness of the laminae "L" corresponds to the length of the cube corner element segment. The indices of refraction $\eta_0$ is 1 and $\eta_1$ is greater than 1. Surface 154 of the cube corner element segment is divided into two regions $D_1$, $D_2$ on either side of a light ray having an entrance angle 156 that intersects the apex 158, where:

$$D_1 = (L - H \tan \delta)(1 - \tan \delta \tan \phi); \text{ and}$$

$$D_2 = H(\tan \delta + \tan \phi)$$

The ratio of $D_1:D_2$ is preferably in the range of about 0.5 to about 2.0, and more preferably about 1.

Also disclosed herein is a method for making a retroreflective sheeting comprising a substantially optically transmissive surface layer and a plurality of optically opposing retroreflective cube corner element segments. The cube corner element segments include a tetragonal base having a first side defined by a groove vertex, a second virtual side opposite the first edge, and opposing third and fourth sides connecting the first and second sides. The second virtual side is an imaginary axis that joins the groove vertex of the third and fourth sides. The first and second mutually tetragonal optical faces extend from the respective third and fourth sides of the base. The tetragonal optical faces intersect along a common edge to define an approximately perpendicular dihedral angle. A triangular optical face extends from the first side of the base disposed approximately perpendicular to the tetragonal optical faces. The triangular optical face intersecting the first and second mutually tetragonal optical faces along respective common edges defines a cube corner element segment.

In the manufacture of retroreflective articles such as retroreflective sheeting, the structured surface of the plurality of laminae is used as a master mold which can be replicated using electroforming techniques or other conventional replicating technology. The plurality of laminae can include substantially identical cube corner elements or alternately cube corner elements of varying sizes, geometries, or orientations. The structured surface of the replica, referred to in the art as a 'stamper,' contains a negative image of the cube corner elements. This replica can be used as a mold for forming a retroreflector. More commonly, however, a large number of positive or negative replicas are assembled to form a mold large enough to be useful in forming retroreflective sheeting. The laminae preferably have a thickness of about 0.05 millimeters to about 0.25 millimeters.

Preferred retroreflective sheeting can be manufactured as an integral material, e.g. by embossing a preformed sheet with an array of cube corner elements as described above or by casting a fluid material into a mold. See, JP 8-309851 and U.S. Pat. No. 4,601,861 (Pricone). Alternatively, the retroreflective sheeting can be manufactured as a layered product by casting the cube corner elements against a preformed film as taught in PCT application No. WO 95/11464 (published Apr. 27, 1995) and U.S. Pat. No. 3,648,348 or by laminating a preformed film to preformed cube corner elements. By way of example, effective sheeting can be made using a nickel mold formed by electrolytic deposition of nickel onto a master mold. The electroformed mold can be used as a stamper to emboss the pattern of the mold onto a polycarbonate film approximately 500 μm thick having an index of refraction of about 1.59. The mold can be used in a press with the pressing performed at a temperature of approximately 175° to 200° C.

Useful materials for making preferred reflective sheeting are materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting according to the invention are disclosed in U.S. Pat. No. 5,450,235 to Smith et al. The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with retroreflective sheeting according to the invention. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements. Sealing can be accomplished by various methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material can be rolled or cut into strips or other suitable designs. The retroreflective material can also be backed with an adhesive and a release sheet to render it useful for application to any substrate without the added step of applying an adhesive or using other fastening means.

Preferred cube corner elements can be individually tailored so as to distribute light retroreflected by the articles into a desired pattern or divergence profile, as taught by U.S. Pat. No. 4,775,219. Typically the groove half-angle error introduced will be less than ±20 arc minutes and often less than ±5 arc minutes.

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. A method of manufacturing a plurality of laminae for use in a mold suitable for use in forming retroreflective cube corner articles, each lamina having opposing first and second major surfaces defining therebetween a first reference plane, the first and second major surfaces being substantially planar, each lamina further including a third surface connecting the first and second major surfaces, the method comprising:

- orienting a plurality of laminae in an assembly to have their respective first reference planes parallel to each other and disposed at a first angle relative to a fixed reference axis;
- forming a plurality of cube corner elements on the third surfaces of at least some of the plurality of the laminae by machining at least three intersecting sets of parallel grooves, each cube corner element having three approximately mutually perpendicular lateral faces, and wherein an assembly of the plurality of laminae defines a mold surface in the third surfaces thereof; and
- removing at least a portion of at least one lamina to alter the configuration of the mold surface.

2. A method of manufacturing a plurality of laminae for use in a mold suitable for use in forming retroreflective cube corner articles, each lamina having opposing first and second major surfaces defining therebetween a first reference plane, each lamina further including a third surface connecting the first and second major surfaces, the method comprising:

- orienting a plurality of laminae in an assembly to have their respective first reference planes parallel to each other and disposed at a first angle relative to a fixed reference axis;
- forming a plurality of cube corner elements on the third surfaces of at least some of the plurality of the laminae at least in part while the laminae are disposed at the first angle relative to the fixed reference axis, each cube corner element having three approximately mutually perpendicular lateral faces, and wherein an assembly of the plurality of laminae defines a mold surface in the third surfaces thereof; and
- machining at least one major surface of at least one lamina to alter the configuration of the mold surface.

3. A method of manufacturing a plurality of laminae for use in a mold suitable for use in forming retroreflective cube corner articles, each lamina having opposing first and second major surfaces defining therebetween a first reference plane, each lamina further including a third surface connecting the first and second major surfaces, the method comprising:

- orienting a plurality of laminae in an assembly to have their respective first reference planes parallel to each other and disposed at a first angle relative to a fixed reference axis;
- forming a plurality of cube corner elements on the third surfaces of at least some of the plurality of the laminae while the laminae are disposed at the first angle relative to the fixed reference axis, the plurality of cube corner elements defining a first, second, and third set of parallel grooves that mutually intersect at first, second, and third base angles $\beta_1$, $\beta_2$, $\beta_3$, each cube corner element having three approximately mutually perpendicular lateral faces, and wherein an assembly of the plurality of laminae defines a mold surface in the third surfaces thereof; and
- removing at least a portion of at least one lamina from the assembly to alter the configuration of the mold surface.

4. A method of manufacturing a plurality of laminae for use in a mold suitable for use in forming retroreflective cube corner articles, each lamina having opposing first and second major surfaces defining therebetween a first reference plane, each lamina further including a third surface connecting the first and second major surfaces, the method comprising:

- orienting a plurality of laminae in an assembly to have their respective first reference planes parallel to each other and disposed at a first angle relative to a fixed reference axis;
- forming a plurality of cube corner elements on the third surfaces of at least some of the plurality of the laminae by machining a first groove set while the laminae are disposed at the first angle relative to the fixed reference axis, the first groove set including at least two parallel adjacent grooves defining a first groove surface and a second groove surface that intersect substantially orthogonally, and by machining a second groove set defining a third groove surface that intersects substantially orthogonally the first and second groove surfaces to form at least one cube corner element, each cube corner element having three approximately mutually perpendicular lateral faces, and wherein an assembly of the plurality of laminae defines a mold surface in the third surfaces thereof; and
- removing at least a portion of at least one lamina from the assembly to alter the configuration of the mold surface;
- wherein the first angle is greater than zero; and
- wherein the plurality of lamina are oriented to have their respective first reference planes parallel to each other and disposed at a second angle relative to the fixed reference axis prior to forming the second groove set, the second angle being different from the first angle.

5. The method of claim 4, wherein the third surface of each lamina defines a second reference plane substantially parallel to the third surface and perpendicular to the first reference plane, the method further comprising:

- rotating some of the plurality of the laminae 180° about an axis perpendicular to the second reference plane prior to forming the second groove set.

6. A method of manufacturing a plurality of laminae for use in a mold suitable for use in forming retroreflective cube corner articles, each lamina having opposing first and second major surfaces defining therebetween a first reference plane, each lamina further including a third surface connecting the first and second major surfaces, the method comprising:

- orienting a plurality of laminae in an assembly to have their respective first reference planes parallel to each other and disposed at a first angle relative to a fixed reference axis;
- forming a plurality of cube corner elements on the third surfaces of at least some of the plurality of the laminae, each cube corner element having three approximately mutually perpendicular lateral faces, and wherein an assembly of the plurality of laminae defines a mold surface in the third surfaces thereof; and
- removing at least a portion of at least one lamina to alter the configuration of the mold surface;
- wherein the forming step comprises machining at least one set of parallel grooves such that at least two adjacent grooves have different groove depths.

7. A method of manufacturing a plurality of laminae for use in a mold suitable for use in forming retroreflective cube corner articles, each lamina having opposing first and second major surfaces defining therebetween a first reference plane, each lamina further including a third surface connecting the first and second major surfaces, the method comprising:

orienting a plurality of laminae in an assembly to have their respective first reference planes parallel to each other and disposed at a first angle relative to a fixed reference axis;

forming a plurality of cube corner elements on the third surfaces of at least some of the plurality of the laminae, each cube corner element having three approximately mutually perpendicular lateral faces, and wherein an assembly of the plurality of laminae defines a mold surface in the third surfaces thereof; and removing at least a portion of at least one lamina to alter the configuration of the mold surface;

wherein the forming step comprises forming a set of parallel grooves having a variable groove spacing.

8. The method of claim 1, wherein the intersecting sets of parallel grooves comprise two secondary groove sets that intersect to define a first angle $\beta_1$, and a primary groove set that intersects the secondary groove sets to define a second and third angle $\beta_2$ and $\beta_3$ respectively.

9. The method of claim 8, wherein the angles $\beta_1$, $\beta_2$, and $\beta_3$ form the base angles of a triangle.

10. The method of claim 8, further comprising removing a plurality of laminae from the assembly prior to machining the primary groove set.

11. The method of claim 8, wherein the angle $\beta_1$ measures between 0° and 60°.

12. The method of claim 8, wherein the angle $\beta_1$ measures between about 10° and about 45°.

13. The method of claim 8, wherein the angle $\beta_1$ measures between about 24° and about 40°.

14. The method of claim 8, wherein the forming step comprises forming successive grooves in the primary groove set every $n^{th}$ laminae, where n is an integer greater than 1.

15. The method of claim 8, wherein the removing step comprises removing laminae selected from the group of laminae which lack a primary groove in their respective third surfaces.

16. The method of claim 8, further comprising reassembling a plurality of the laminae comprising a primary groove on their respective third surfaces to form a mold surface including a plurality of cube corner element segments.

17. The method of claim 16, wherein the cube corner element segments represent more optically active portions of the respective cube corner elements.

18. The method of claim 1, further comprising rotating one or more of the laminae within the assembly 180°.

19. The method of claim 1, wherein the third surfaces of the plurality of laminae are substantially parallel but not coplanar.

20. The method of claim 1, wherein the third surfaces of the plurality of laminae are substantially coplanar.

21. The method of claim 1,
wherein the orienting step comprises assembling the plurality of laminae in a suitable fixture, the fixture defining a base plane;
wherein the fixed reference axis is substantially normal to the base plane; and
wherein the first angle measures about 0°.

22. The method of claim 1,
wherein the orienting step comprises assembling the plurality of laminae in a suitable fixture, the fixture defining a base plane;
wherein the fixed reference axis is substantially normal to the base plane; and
wherein the first angle measures from about 0° to about 40°.

23. The method of claim 22, wherein the first angle measures from about 7° to about 30°.

24. The method of claim 1, wherein the forming step is performed while the first angle is greater than zero, the method further comprising:
reorienting the plurality of laminae after the forming step to have their respective first reference planes parallel to each other and disposed at a second angle different than the first angle.

25. The method of claim 24, wherein the second angle is less than the first angle.

26. The method of claim 24, wherein the second angle is about zero.

27. The method of claim 1, wherein machining comprises a material removal technique selected from the group of ruling, fly-cutting, grinding, and milling.

28. The method of claim 1, wherein the forming step comprises inducing relative motion between the plurality of laminae and a cutting tool.

29. The method of claim 1, further comprising replicating the mold surface to form a negative copy of the plurality of cube corner elements suitable for use as a mold for forming retroreflective articles.

30. A mold comprising a copy of the plurality of cube corner elements manufactured according to the method of claim 1.

31. A method of forming retroreflective sheeting, comprising:
providing a mold according to claim 30; and
forming a retroreflective sheeting in the mold.

* * * * *